Aug. 7, 1962   J. H. MURPHEY, JR   3,048,008
ROCKET WITH LARGE PROPELLANT CHARGE UNITS
Filed July 21, 1955   2 Sheets-Sheet 1

INVENTOR.
J. H. MURPHEY, JR.
BY Hudson and Young
ATTORNEYS

Aug. 7, 1962   J. H. MURPHEY, JR   3,048,008
ROCKET WITH LARGE PROPELLANT CHARGE UNITS
Filed July 21, 1955                          2 Sheets-Sheet 2

INVENTOR.
J. H. MURPHEY, JR.
BY *Hudson & Young*
ATTORNEYS 3,048,008
ROCKET WITH LARGE PROPELLANT
CHARGE UNITS
Joseph H. Murphey, Jr., McGregor, Tex., assignor to Phillips Petroleum Company, a corporation of Delaware
Filed July 21, 1955, Ser. No. 523,582
18 Claims. (Cl. 60—35.6)

This invention relates to means for assembling and supporting large multigrain propellant charges for rocket motors. A specific aspect of the invention pertains to a frame for assembling and supporting multigrain propellant charges and to means for loading and supporting the frame in a rocket motor case.

Rocket propellant grains in the form of relatively large slabs in the form of rectangular prisms for positioning in spaced-apart relation in a rocket motor is a recent development. There is need for high powered rockets powered by such propellant grains assembled in relatively large charge units. The application of R. B. Adelman, Serial No. 453,772, filed September 2, 1954, now Patent No. 2,939,396 discloses a propellant grain in the form of a slab having rods running longitudinally therethrough which is adapted for assembling into large units for charging a rocket motor. This invention is concerned with means for assembling such rocket propellant grains into readily chargeable units for rocket motors and to means for supporting such units in the rocket case or shell.

The objects of the invention include the provision of means for assembling propellant grains or slabs into rigid structural units for facilitating easy charging of a rocket motor; the provision of means for rigidly supporting propellant charge units in a rocket motor; the provision of a frame for supportig propellant grain which may be readily positioned in a rocket case either singly or in end-to-end groups; and also the provision of an improved rocket motor charged with such units. Other objects of the invention will be made obvious on consideration of the accompanying disclosure.

Figure 1:
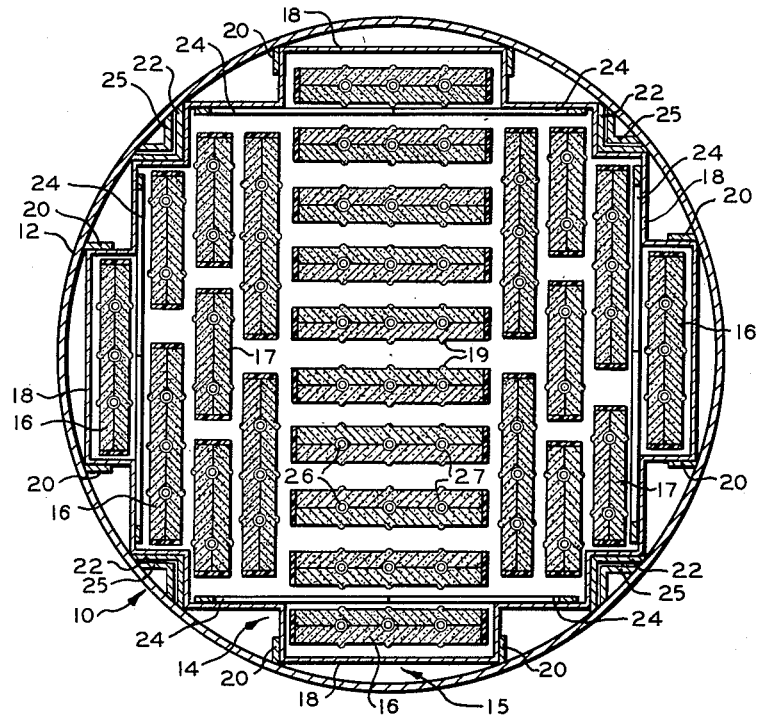
Figure 2:
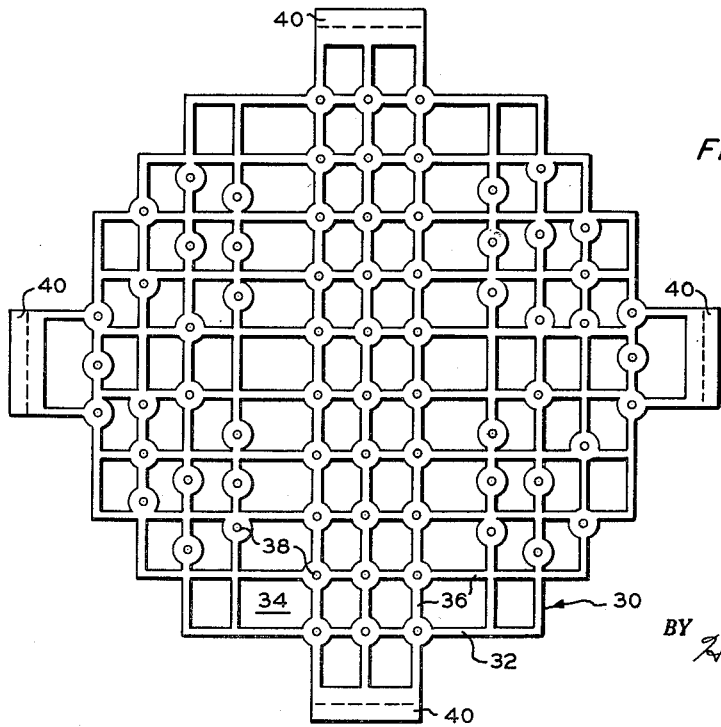
Figure 3:
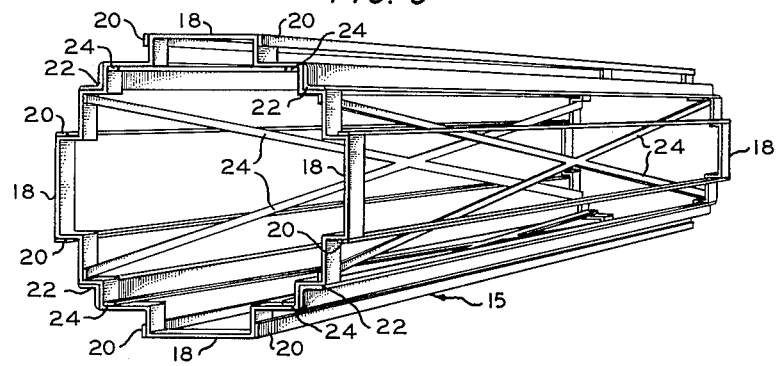
Figure 4:
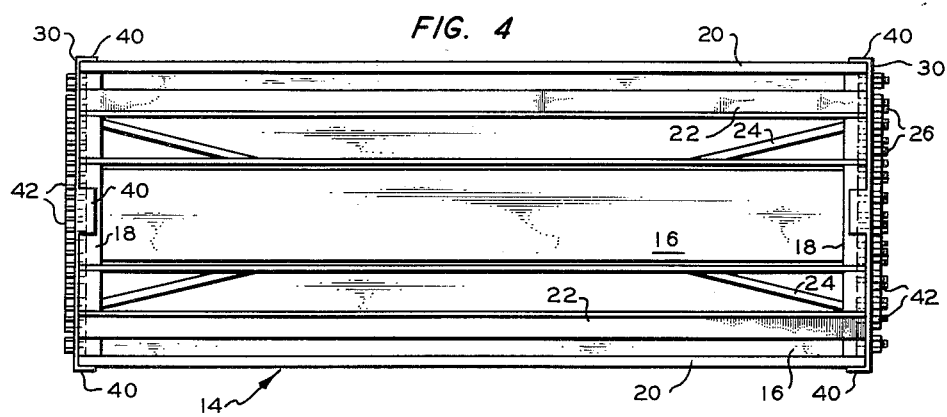
Figure 5:
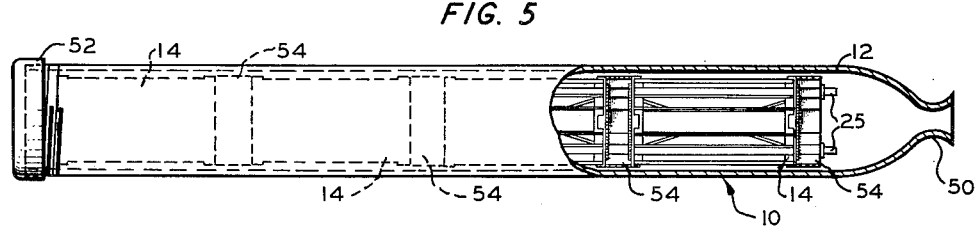

The invention is best understood by reference to the accompanying schematic drawing comprising FIGURE 1 which is an end elevation of one of the charge units positioned in a rocket motor shell or case with the end plate of the unit removed; FIGURE 2 which is a plan view of a unit end plate adapted to fit the frame and slab arrangement of FIGURE 1; FIGURE 3 which is a pictorial view of a preferred embodiment of a frame suitable for use in the structure and arrangement of FIGURES 1 and 2; FIGURE 4 which is a side elevation of a complete unit illustrated in FIGURES 1 and 2; FIGURE 5 which is a side elevation, partially in section, of a rocket motor charged with several of the units of the invention; and FIGURE 6 which is a fragmentary pictorial view of an end portion of one of the slabs or rocket propellant grains used in the charging units. Corresponding parts or elements of the various figures are correspondingly numbered.

Referring to FIGURE 1, numeral 10 designates a rocket motor having a shell or case 12 which is charged with a propellant charge unit 14 comprising an arrangement of propellant slabs 16 and 17 supported in a frame 15 including a pair of end plates shown in FIGURE 2. Frame 15 is constructed of a pair of opposed end formers 18, one of which is shown, connected by stringers 20 and L-irons 22. The frame is cross braced where desired or additional strength is required by means of diagonal braces 24 which may be seen more clearly in FIGURE 4. The two pairs of diametrically opposed L-irons stringers 22 articulate with L-irons 25 which are welded to case 12 so as to support and prevent substantial rotary or lateral movement of the unit after it is charged into the case. Lower L-irons 25 serve as a track or a pair of rails on which to load the unit into the case. L-irons 25 extend substantially the length of the rocket case to permit loading of a plurality of charging units.

Each of slabs 16 and 17 is provided with at least a pair of supporting rods which extend completely through the slab and provide means for fixation to the end plates in spaced arrangement. Rods 26 are provided with a shoulder 27 which contacts the end plate when the same is attached to the unit although it is feasible to omit shoulders 27 and allow the end plates to contact the ends of the slabs directly. Slabs 16 and 17 are provided with ridges 19 opposite rods 26 in order to improve the burning characteristics of the slabs and the slabs are coated on the edges and ends with a slow-burning material which limits or restricts the burning area of the slabs to the two broad faces thereof.

The end plate 30 of FIGURE 2 is preferably stamped out of a sheet of strong metal (100,000–150,000 p.s.i. tensile) such as a ferrous metal or alloy and is of retiform and generally cruciform configuration comprising a peripheral band or border 32 taking the general shape of end former 18 of FIGURE 1. The border 32 is of zigzag pattern with the outermost corner corresponding substantially with the inner circumference of a cylindrical rocket case for which the unit is designed. The retiform design of the end plate is made by stamping out metal from spaces 34 to leave crisscrossing bands of metal 36 for the purpose of supporting rods 26 in holes 38, which are formed in the bands 36 by stamping, drilling, pressing, or any other suitable means. Extra metal is provided around holes 38 to increase the strength of the end plates. Holes 38 are spaced so as to coincide with the positions of rods 26 as shown in FIGURE 1 so that as end plate 30 is placed over the ends of rods 26 in the assembly shown, the slabs are held firmly and rigidly in the position illustrated. End plate 30 superimposes on the end arrangement shown in FIGURE 1 so that all of the rod holes coincide with the rods and the periphery of plate 30 coincides with the periphery of end former 18.

Sections or ears 40 on end plate 30 are provided so that when the same are bent at right angles to the plane of the end plate, they serves as flanges which engage either the inside or outside surface of end former 18 as seen more clearly in FIGURE 4. It is also feasible to weld or rivet or otherwise secure flanges 40 to end plate 30 at the desired positions to engage the frame end former of FIGURE 1. In one embodiment of the invention rods 26 merely extend through openings 38 in end plate 30 and are not secured by nuts threaded on the rods. In this modification, rods 26 may or may not be provided with shoulders for engagement with the end plate but is preferred to provide the rods with such shoulders particularly in view of the fact that the end plate is not secured by nuts; however, when nuts are not utilized to secure the end plate to the rods, flanges 40 or equivalent fasteners must be secured to frame formers 18 by welding, riveting, or equivalent means. Where nuts are not used to secure end plate 30, in order to stiffen and strengthen the end plate, metal ribs may be attached to the outside surface of the end plate directly to the crisscrossing bands of metal 36. It is also feasible to secure any portion of the rods with nuts to provide sufficient stability to the structure to permit handling and loading. It is also feasible to improve the strength of end plate 30 by stamping the same so as to leave metal flanges on either or both erges of crisscrossing bands 36. In utilizing this modification of the end plate, it may be necessary to secure only a portion of the rods to the end plate by means of nuts. In any of the modifications described it is essential to provide sufficient rigidity to the complete unit, including the frame and propellant slabs, to permit handling and loading without danger of disrupting the unit.

FIGURE 3 shows frame assembly 14 comprising a pair of end formers 18 spaced apart in perpendicular planes and rigidly connected by flat stringers 20 and L-irons 22. The end formers are preferably formed of flat metal bands or strips conforming to the pattern of the propellant charge and that of the end plate and welded or otherwise secured at its ends to form a continuous band of metal. Stringers 20 and 22 preferably overlap end formers 18 and are welded to same, although they may be secured by riveting or other means. In constructing large units it is usually desirable to provide the frame with cross braces 24 which are rigidly secured at their ends to the end formers by any suitable means, such as welding, and which are preferably secured to each other at the area of intersection.

FIGURE 4, which is a side elevation of the propellant charge unit, shows more clearly the fastening of end plates 30 to rods 26 by nuts 42 and to the end of the frame. In instances where nuts 42 are utilized to secure the end plate to the shoulders of rods 26, it is not essential to rigidly attach or secure flanges 40 to end formers 18 as the length of rods 26 between shoulders can be regulated so that, when nuts 42 are brought up firmly against the end plate, the same is forced firmly against end formers 18. The other details of FIGURE 4 are obvious from the description of FIGURES 1, 2, and 3.

Referring to FIGURE 5, a rocket motor 10 comprises a shell or case 12 having attached to one end a nozzle 50 and to the opposite end a closure or cover 52. The rocket is loaded or charged with four frame units 14 separated by spacers 54. Spacers 54 may comprise a short section of frame having the general cross sectional contour of the periphery of the frame units. It is also feasible to omit the spacers and insert the charging units into the rocket directly in contact with each other and design the rocket motor so that cover plate or closure 52 tightens directly against the end of the adjacent frame, or directly against a resilient spacer which compresses against the end of the adjacent frame. It is also feasible to load the rocket from the nozzle end in the same manner in a construction providing a removable nozzle.

Figure 6:
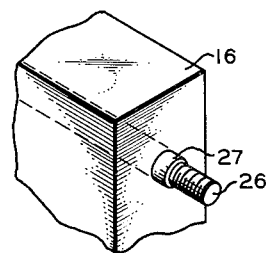

FIGURE 6 shows more clearly the rod and shoulder construction of slab 16 and is self-explanatory.

One rocket design provides a total impulse of 1 million pounds delivered over a 4 second period. Such a rocket is powered by the plank shaped rod-supported propellant grains described in the aforesaid Adelman application. The individual grains are prepared from a rubbery copolymer-oxidizer formulation described by Reynolds and Pritchard, application Serial No. 561,943, filed January 27, 1956. The burning rate of the propellant is 0.25 inch/second, which dictates a 1″ web or a 2″ total slab thickness. This specific propellant has a density of 0.0545 to 0.0570 lb./cu. in. and requires approximately 6,000 pounds of propellant to deliver the specified impulse or thrust in an efficiently designed motor. The motor case required is approximately 38 inches inside diameter and has a cylindrical combustion section, inclusive of nozzle and closure sections, of 17 feet. The propellant slabs of two different sizes are arranged in 4 similar sections. Seventy-two slabs 2″ by 12″ by 48″ and thirty-two slabs 2″ by 8″ by 48″ are utilized in building the four units for charging into the motor case. The slabs are arranged in the individual units as illustrated in FIGURE 1 in a frame corresponding to that shown in the drawing. The slabs utilized in the assembly are all restricted on the ends and edges with a slow-burning material tightly bonded to the restricted surface of the propellant. The 12″ slabs have three 3/8″ support rods bonded to the surrounding grain with two similar rods in the 8″ slabs in the manner illustrated in FIGURE 6. The slabs are secured to the end plates by means of their rods and by nuts threaded onto their ends outside of the end plates to bring the end plates firmly against the shoulders on the rods and against the frame end formers.

After assembly of the individual units as illustrated in the drawing, the same are loaded or charged into the rocket case on the L-irons provided therein for support of the frames as illustrated.

One method of assembling the units comprises laying an end plate in horizontal position on a well supported jig which provides openings to receive the ends of the grain rods and allow sufficient room for threading the nut onto the rods. The slabs are then stood on end in their proper locations with the rods extending through the holes in the end plate and utilizing a supporting form to keep the slabs in substantially upright position. After all are inserted or as each is inserted, nuts are threaded onto the lower ends of the rods and tightened up to fix the slabs to the end plates. Next, the frame, substantially as shown in FIGURE 3, is placed in position around the slabs and the opposite end plate is positioned on the upper ends of the support rods, and with the assistance of a spacing and aligning jig, the rods are positioned in the required pattern so that the end plate passes over the ends of the rods and the rods enter the openings therein. The upper jig is then removed and the nuts are threaded onto the rods and tightened as before. The unit is then ready for insertion in the rocket motor case utilizing the four angle irons of the frame which articulate with the four angle irons welded into the case.

The invention is not limited to the specific design of the load formation illustrated. The slabs of propellant may be arranged in other patterns which utilize to advantage the space in the rocket case and provide sufficient open area between the slabs to effect efficient operation of the motor. The periphery of the frame end former and end plate will have a generally cruciform configuration when the unit is designed properly for a cylindrical rocket case.

Certain modifications of the invention will become apparent to those skilled in the art and the illustrative details disclosed are not to be construed as imposing unnecessary limitations on the invention.

I claim:

1. A loading frame for positioning propellant grains in spaced-apart relation and insertable as a unit when charged with grains in a rocket comprising in combination a pair of retiform end plates provided with spaced-apart rod holes in the crisscrossing elements adapted to receive the supporting rods of individual rocket grains extending between said plates, the periphery of each plate following a zigzag path inwardly from a circumference corresponding to the inner wall of a cylindrical rocket case; and a plurality of elongated parallel stringers connecting the outer edges of said plates to space same parallel and at right angles to said stringers.

2. The frame of claim 1 including an end former adjacent the inside surface and outer edge of each end plate comprising a thin endless member coinciding in shape with the periphery of the end plate and positioned edgewise to said end plate, said stringers being rigidly attached at their opposite ends to said end formers, and at least a pair of diametrically opposite flanges on each of said end plates extending inwardly in engagement with the adjacent end former.

3. The frame of claim 2 including a plurality of L-shaped stringers in said frame adapted to articulate with as many L-shaped support rails correspondingly attached to the inside wall of a cylindrical rocket case for use in sliding a loaded frame into said case.

4. A rocket propellant charge comprising the frame of claim 1 including a plurality of laterally spaced-apart elongated rocket grains each having support rods extending longitudinally therethrough and through said end plates to form a structurally rigid unit, said grains being bonded to said rods.

5. The unit of claim 4 wherein nuts are threaded onto both ends of said rods to hold said end plates more rigidly to said grains.

6. The unit of claim 4 wherein said rods are provided with shoulders intermediate the ends of said grains and the ends of the rods and including nuts threaded onto said rods outside of said end plates to force same against said shoulders and thereby rigidly position said plates without applying pressure on said grains.

7. A rocket comprising an elongated cylindrical shell having an exhaust nozzle at one end; a propellant charge supported in said shell comprising a series of structurally rigid units including a frame axially aligned therein, each of said units comprising a pair of parallel retiform end plates between which are held a plurality of laterally spaced-apart propellant grains having rods extending therethrough to which the grains are bonded and the ends of which extend through and are rigidly supported by said end plates, and stringers rigidly connecting said end plates; and means for holding said units rigidly in said shell.

8. The rocket of claim 7 including nuts threaded on said rods against the outside of said end plates to rigidly fix said rods and said grains in said frame.

9. The rocket of claim 8 including at least one pair of diametrically opposed stringers of L-shaped transverse cross section and as many articulating L-shaped support rails attached to the inside of said shell.

10. The rocket of claim 7 including at least one pair of diametrically opposed stringers of L-shaped transverse cross section and as many articulating L-shaped support rails attached to the inside of said shell.

11. The rocket of claim 7 including spacers between said units having a transverse cross section substantially corresponding to that of said frame.

12. The rocket of claim 7 including an end former adjacent each end plate comprising a continuous flat metal band positioned adjacent the periphery of the end plate and having the configuration thereof, the width of said band running perpendicular to the end plate and said band being rigidly attached to said stringers.

13. The rocket of claim 12 including flanges on said end plates which engage said end formers to prevent lateral movement of said grains in said frame.

14. The rocket of claim 7 wherein said rods have shoulders intermediate the end of said grains and the rod ends against which said end plates are firmly held by nuts threaded on said rods outside of said end plates.

15. A rocket propellant frame generally symmetrical along a longitudinal axis comprising a duplicate pair of peripheral end-formers disposed at each end of said frame perpendicular to said axis having the general contour of the periphery of the transverse cross-section of a rocket propellant load thereby providing space within said end-formers for said load, each said end-former comprising a continuous flat metal band conforming to the shape of said periphery with the flat sides thereof parallel with said axis; and stringers parallel with said axis rigidly attached at opposite ends to the periphery of said end-formers to hold same perpendicular to said axis, said end-formers and stringers forming a peripheral frame free of internal obstructions for enclosing a propellant load.

16. The frame of claim 15 wherein said periphery is cruciform and said stringers are fixed to corresponding arms of the cruciform end-formers.

17. The frame of claim 16 including at least one pair of diametrically opposed stringers of an L-shaped transverse cross-section disposed parallel to said axis with the angle of the L directed toward said axis and connected to corresponding arms of said cruciform end-formers being adapted to cooperate with supporting and guiding track in a rocket case when loading said frame into said rocket case.

18. The frame of claim 17 including two pairs of said L-shaped stringers positioned diametrically opposite in pairs and spaced 90 degrees apart around the periphery of said end-formers.

References Cited in the file of this patent

UNITED STATES PATENTS

| | | |
|---|---|---|
| 2,405,415 | Eksergian | Aug. 6, 1946 |
| 2,503,270 | Hickman | Apr. 11, 1950 |
| 2,548,926 | Africano | Apr. 17, 1951 |
| 2,728,295 | Rubin et al. | Dec. 27, 1955 |